(No Model.)
I. P. CLARKE.
AUTOMATIC SAFETY GUARD FOR CARS.
No. 510,675. Patented Dec. 12, 1893.
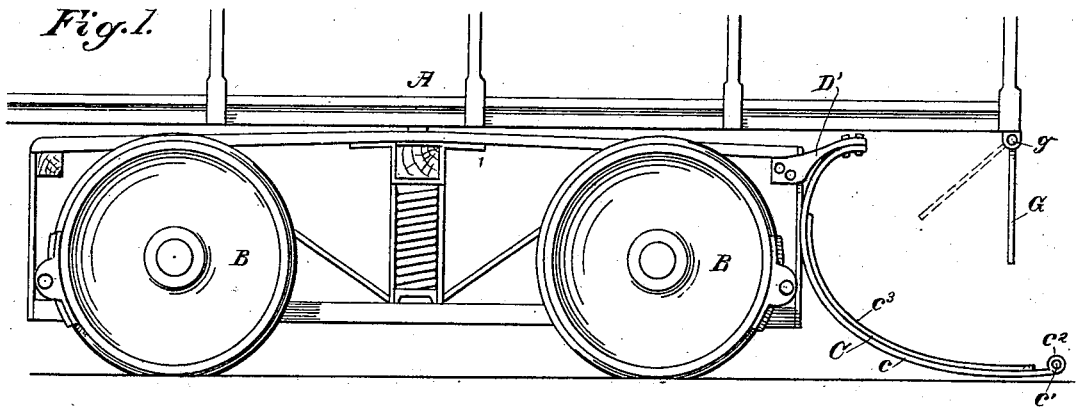
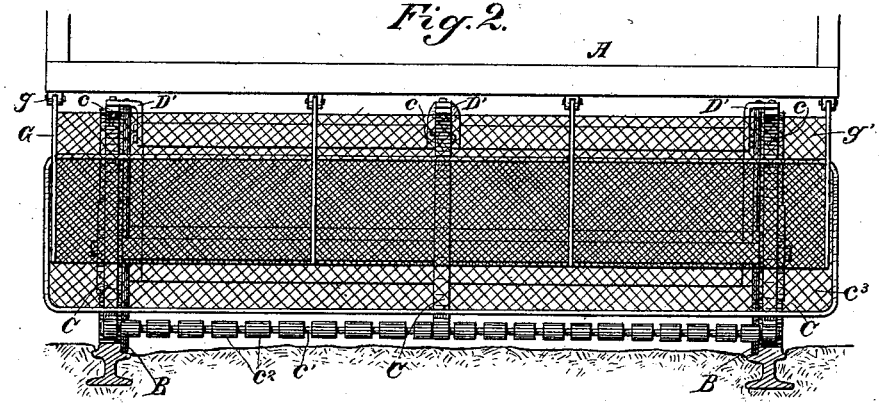
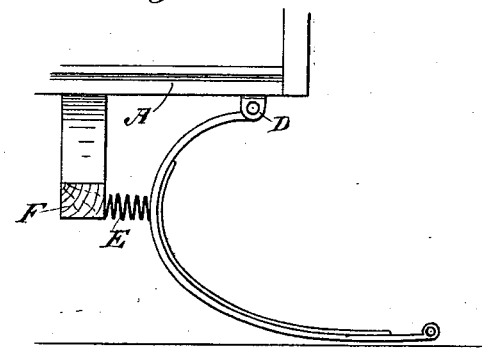
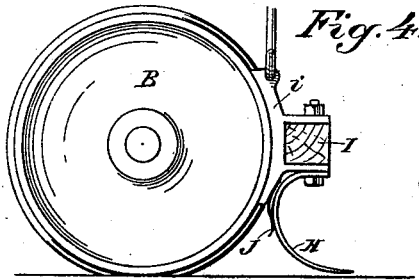
Witnesses:
Inventor
Ira P. Clarke
By Dewey & Co.
Atty.

UNITED STATES PATENT OFFICE.

IRA P. CLARKE, OF ALAMEDA, ASSIGNOR OF ONE-THIRD TO JOHN H. KOSTAR, OF OAKLAND, CALIFORNIA.

AUTOMATIC SAFETY-GUARD FOR CARS.

SPECIFICATION forming part of Letters Patent No. 510,675, dated December 12, 1893.

Application filed December 13, 1892. Serial No. 455,041. (No model.)

*To all whom it may concern:*

Be it known that I, IRA P. CLARKE, a citizen of the United States, residing in Alameda, Alameda county, State of California, have invented an Improvement in Automatic Safety-Guards for Cars; and I hereby declare the following to be a full, clear, and exact description of the same.

My invention relates to the class of safety guards adapted to be attached to cars, dummies, locomotives and other traveling vehicles; and it consists in certain features of construction and combination of parts, which will be hereinafter described and claimed.

The object of my invention is to provide a guard which while conforming to all the requirements of travel, is adapted to automatically pick up the obstructing body and deposit it upon itself, holding it there safely and with as little injury as possible.

Referring to the accompanying drawings for a more complete explanation of my invention,—Figure 1 is a side elevation of a car showing my safety guard, connected with the truck frame. Fig. 2 is a front view of the same. Fig. 3 shows the guard hinged and connected with the car. Fig. 4 shows the guard in front of a single wheel.

A is the car, having the wheels B. C is the guard proper. This consists of a series of approximately C-shaped arms $c$, the lower portions of which are longer than the upper portions and project forwardly. These arms may be hung from the car body as in Fig. 3, or from the truck frame, as in Figs. 1 and 2. They may be hinged at their upper ends to bearings D as in Fig. 3, or be bolted to brackets D', as in Fig. 1, and be of a springy nature. These arms hang in a state of equilibrium, with their forward ends projecting and provided with a connecting shaft $c'$ on which are rollers $c^2$. The arms may be in any sufficient number, and close enough together to form a complete guard of themselves, or they may be connected into a suitable frame, and I have here shown them as connected and covered with a netting $c^3$, thus forming the guard into a concave or dish-shaped receptacle or frame. The whole guard hangs in the position shown, but in order to keep it from having an undue vibratory motion, I hold it forward by light springs E acting against the back of the arms, said springs being held in place by a fixed beam F. This beam and springs also serve the purpose of limiting the backward movement of the guard, keeping it from being pressed backward too far.

G is a frame-work or flap hinged at its top at the points $g$ to the front of the car, and extending downwardly a given distance in front of the guard proper. This flap is covered by a netting $g'$, and the hinges at $g$ are of such a nature that the frame may move inwardly or backwardly under the car, but cannot move any farther forward than a vertical position.

In operation the guard travels in the position shown at a very little distance above the roadbed. When the obstructing body is met, the guard is automatically pressed backward, and turning about its hinge, when so suspended, or moving back by reason of the springy character of the arms $c$ when said arms are bolted, as in Fig. 1, throws its front edge right down upon the surface of the roadbed so as to prevent the body from getting under it. Instead, however, the body is picked up by the front of the guard and rolled back into itself, pressing backward the protecting flap G, and falling completely into the dish-shaped guard, and in this position it is confined by the flap G, which will not allow it to be thrown out again. The C-shaped arms, serving as a guard and hanging in the manner described, are applied also to the brake-beam or brake-shoe in front of each wheel of the car.

H represents the arm, I the brake-beam, and $i$ the brake-shoe.

J is a spring which holds the arm H forward. This protects the track and prevents anybody from getting under the wheels, said arms operating, as heretofore described, to be automatically pressed down upon the rails by contact with the obstructing body.

Having thus described my invention, what I claim as new, and desire to secure by Letters Patent, is—

1. A safety guard for cars consisting of a frame or receptacle composed of C shaped arms, suspended from the truck and movable backward by yielding about their upper ends, with their lower ends forwardly projecting over the road bed, and connected by a cross bar, and rollers journaled on the cross bar and the backwardly yielding flap suspended from above and in front of the upper portion of the guard frame or receptacle, substantially as herein described.

2. A safety guard for cars consisting of a dish-shaped frame or receptacle suspended from and yielding backwardly about its upper edge, whereby its lower edge is forced down upon the road-bed by contact with an obstructing body and said body received into the receptacle, and a backwardly yielding protecting flap suspended from above and in front of the upper portion of the receptacle, substantially as herein described.

3. A safety guard for cars, consisting of a frame or receptacle composed of a series of C-shaped arms suspended from and backwardly yielding about their upper ends, with their lower ends projecting forwardly and above the roadway, and a backwardly yielding protecting flap suspended from above and in front of the upper portion of the guard frame or receptacle, substantially as herein described.

4. A safety guard for cars, consisting of backwardly yielding arms suspended by their upper ends from above, with their lower ends projecting forwardly above the road-bed, and springs behind said arms to hold them forward, and the backwardly yielding protecting flap, substantially as herein described.

In witness whereof I have hereunto set my hand.

IRA P. CLARKE.

Witnesses:
S. H. NOURSE,
J. A. BAYLESS.